United States Patent
Burlingame

(10) Patent No.: US 7,747,091 B2
(45) Date of Patent: Jun. 29, 2010

(54) SYSTEMS AND METHODS FOR SECTION-BY-SECTION PROCESSING OF A DIGITAL IMAGE FILE

(75) Inventor: John J. Burlingame, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 923 days.

(21) Appl. No.: 11/216,838

(22) Filed: Aug. 31, 2005

(65) Prior Publication Data

US 2005/0286782 A1 Dec. 29, 2005

Related U.S. Application Data

(63) Continuation-in-part of application No. 10/726,798, filed on Dec. 2, 2003.

(60) Provisional application No. 60/500,402, filed on Sep. 5, 2003.

(51) Int. Cl.
  *G06K 9/36* (2006.01)
  *G06K 9/46* (2006.01)

(52) U.S. Cl. ..................................... 382/233; 382/239

(58) Field of Classification Search .................. None
  See application file for complete search history.

(56) References Cited

U.S. PATENT DOCUMENTS

| | | | | |
|---|---|---|---|---|
| 4,918,540 A | * | 4/1990 | Ohtani | 382/239 |
| 5,153,739 A | * | 10/1992 | Laman et al. | 358/300 |
| 5,267,054 A | * | 11/1993 | Chang et al. | 358/3.2 |
| 5,321,521 A | * | 6/1994 | Nomizu | 358/426.12 |
| 5,485,213 A | * | 1/1996 | Murashita et al. | 375/240.12 |
| 5,555,322 A | * | 9/1996 | Terai et al. | 382/232 |
| 5,752,244 A | * | 5/1998 | Rose et al. | 707/5 |
| 5,852,475 A | * | 12/1998 | Gupta et al. | 348/606 |
| 5,886,796 A | * | 3/1999 | Yoshida | 358/442 |
| 5,999,710 A | * | 12/1999 | Smith et al. | 358/1.15 |
| 6,115,134 A | * | 9/2000 | Creel et al. | 358/1.16 |
| 6,549,306 B2 | * | 4/2003 | Fredlund et al. | 358/487 |
| 6,680,976 B1 | * | 1/2004 | Chen et al. | 375/240.26 |
| 6,944,357 B2 | * | 9/2005 | Bossut et al. | 382/298 |
| 6,972,874 B2 | * | 12/2005 | Izumi et al. | 358/402 |
| 7,167,259 B2 | * | 1/2007 | Varga | 358/1.15 |
| 2002/0164073 A1 | | 11/2002 | Lei et al. | |
| 2005/0053289 A1 | | 3/2005 | Burlingame | |

FOREIGN PATENT DOCUMENTS

WO   WO-03/039133   5/2003

* cited by examiner

*Primary Examiner*—Yuzhen Ge
(74) *Attorney, Agent, or Firm*—Austin Rapp & Hardman

(57) ABSTRACT

Systems and methods for section-by-section processing of the digital image file are disclosed. More specifically, the disclosed systems and methods operate in stages to select portions, but not the entirety, of the relevant image data file that is to be processed. With respect to each specified section, practice of one embodiment of these systems and methods involves processing or transforming the selected portion and then storing each processed portion to produce a transformed image data file.

15 Claims, 3 Drawing Sheets

SYSTEMS AND METHODS FOR SECTION-BY-SECTION PROCESSING OF A DIGITAL IMAGE FILE

CROSS-REFERENCE TO RELATED APPLICATIONS

This application is a continuation-in-part of U.S. patent application Ser. No. 10/726,798 entitled "Staged Full-Image Decompressing, Resizing and Half-Toning By Less than Full-Image Data-File Stages", filed Dec. 2, 2003 and hereby claims priority thereto, which claims priority to U.S. Provisional Patent Application Ser. No. 60/500,402 entitled "Staged Full-Image Decompressing and Half-Toning By Less than Full-Image Data-File Stages", filed Sep. 5, 2003. The inventorship is the same in the prior applications, which are both incorporated herein by reference.

TECHNICAL FIELD

The present invention relates generally to computers and computer-related-technology. More specifically, the present invention relates to a unique system and methodology for processing an image data file.

BACKGROUND AND SUMMARY OF THE INVENTION

The present invention relates to a unique system and methodology for processing an image data file utilizing an approach in which processing takes place in stages, each of which involves image processing in sections (e.g., rows or row regions), defined generally by being less than the whole of the relevant, full-image data file.

According to practice of this invention, an image data file, such as a compressed image data file, is treated in stages which involve less than the full content of the file, such as on a section by section, a line-by-line basis, or a several-line by several-line basis. In one embodiment, in each of the stages, the disclosed systems and methods (a) first perform, with respect to yet un-decompressed image data, a decompression function; (b) next perform any section resizing which may be necessary; (c) next perform an optional color-space transform function; (d) next perform an optional bit depth transform function; (e) next perform a half-toning function; and (f) then perform a buffer-storage function relative to the processed section, until all of the subject data in an image file has been processed.

The various features and advantages of the invention will become more fully apparent as the description which now follows is read in conjunction with the accompanying drawings.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
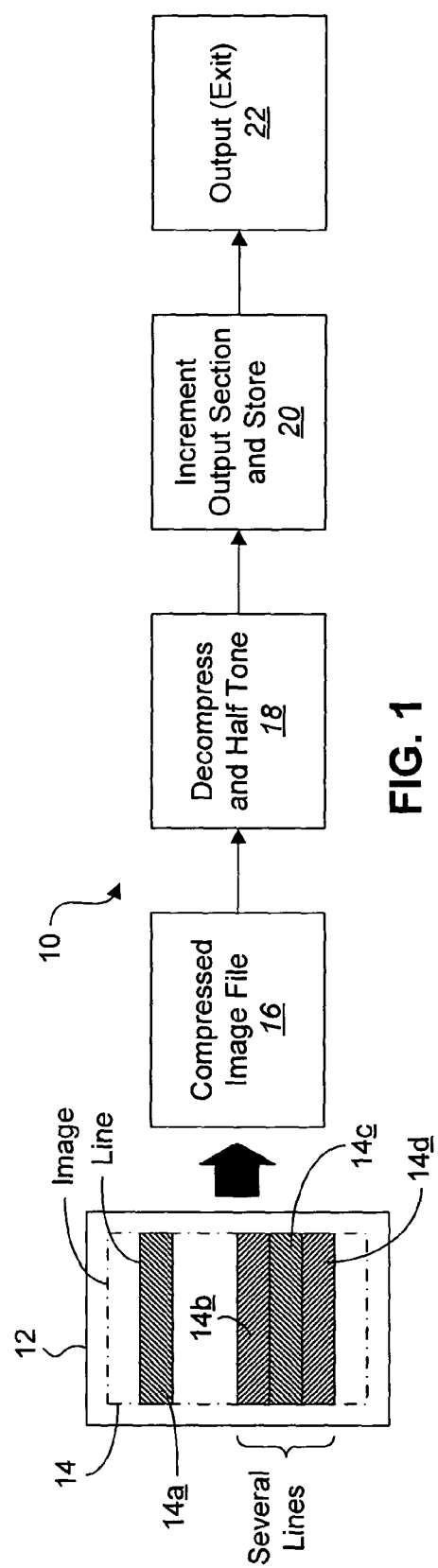
FIG. 1 is a simplified flow diagram illustrating the structure and methodology of the present invention.

A method for section-by-section processing of a digital image file is disclosed. A yet un-decompressed section, which makes up less than the whole image file, is selected from the image data file. The selected section is decompressed. The selected section is color-space transformed in accordance with parameters of the image data file and an output device. The decompressed section is half-toned, and then stored.

In one embodiment, the method further comprises repeating, seriatim, the selecting, decompressing, color-space transforming, half-toning and storing steps until the whole image file has been so processed.

When a selected section is the same as the last previously processed section, the decompressing step may be skipped, and the color-space transforming, half-toning and storing steps may be performed on a decompressed version of the last-processed section to produce a processed section for the selected section.

In one embodiment, intermediate the color-space transforming and half-toning steps, the section may be resized. In such an embodiment, when the selected section is the same as the last previously processed section, the decompressing, color-space transforming, and resizing steps may be skipped, and the half-toning and storing steps may be performed on a decompressed, color-space transformed, and resized version of the last-processed section to produce a processed section for the selected section.

In one configuration, a data signal may be received indicating user input specifying a desired half-toning technique, wherein half-toning the decompressed section comprises half-toning in accordance with the specified half-toning technique.

In one embodiment, a data signal may be received indicating user input specifying a desired output bit depth, and the method further comprises transforming the selected section to the specified output bit depth.

In one embodiment, the method further comprises determining a format of the input image and selecting a size of the section based on a format of the image data file. The half-toning and color-space transforming steps may operate independent of a format of the image data file.

The systems and methods disclosed above may be performed by an apparatus, such as an imaging device or a computing device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Turning now to the drawings, and referring first of all to FIG. 1, indicated generally at 10 herein are the structure and methodology, in their preferred and best-mode forms, of the present invention effectively engaged in an illustrative practice of the invention. At 12 in FIG. 1 is a document which is to be "handled", including an image, shown in dash-dot line at 14, which can be described as being made up of multiple sections, such as the four sections shown at 14*a*, 14*b*, 14*c*, 14*d*. The sections 14*a*, 14*b*, 14*c*, 14*d* may comprise, for example, a vertical, diagonal, or horizontal row of pixels or a row region of pixels (e.g., one or more rows or pixels) or other types of sections of an image 14. Section 14*a* is illustrated isolated from other sections in image 14. Sections 14*b*, 14*c*, 14*d* are illustrated as vertically next-adjacent sections in image 14.

By any suitable technique, and utilizing any appropriate compression algorithm, image 14 has been compressed into a compressed image file which is represented by block 16 in FIG. 1. Shown at 18 is a "Decompress and Halftone" block, a block 20 which is labeled "Increment Output Section and Store", and an "Output", or "Exit", block 22. It is essentially within blocks 18, 20 that the structure, and the implementation, of, the present invention exist and take place, respectively. Block 20 is also referred to herein as storing structure.

As will be more fully elaborated, block 18 processes the compressed image file represented by block 16 by dealing with less than the entirety of the image file in different successive stages of processing. A preferred manner of practicing the invention involves addressing, within file 16, "staged" portions of that file that preferably take the form either of single lines (rows), or of several vertically contiguous lines (rows) of pixels or other sections 14 of the image 14.

With regard to a single section, such as section 14*a*, block 18 may process this, in accordance with the invention, as a section singularity. With regard to vertically contiguous sections, or row regions, such as those indicated at 14*b*, 14*c*, 14*d*, block 18 may effectively deal with these as a unit. Such a "section" might take the form of vertically contiguous sections wherein vertically next-adjacent pixels are alike. Under no circumstance, however, does block 18 deal with the entirety of the image file, such as that represented by block 16.

Within block 18 decompression and half-toning, and if desired any resizing, etc., are performed, and in each stage of processing, or rather at the conclusion of each such stage, the decompressed, resized (if applicable), and half-toned partial result is stored in a buffer which can be viewed as being within block 20 in FIG. 1. When the entirety of image file 16 has been processed by staged decompression of portions of this image file, followed by staged half-toning of those decompressed portions, a final decompressed and half-toned output image is made available via block 22.

Figure 2:
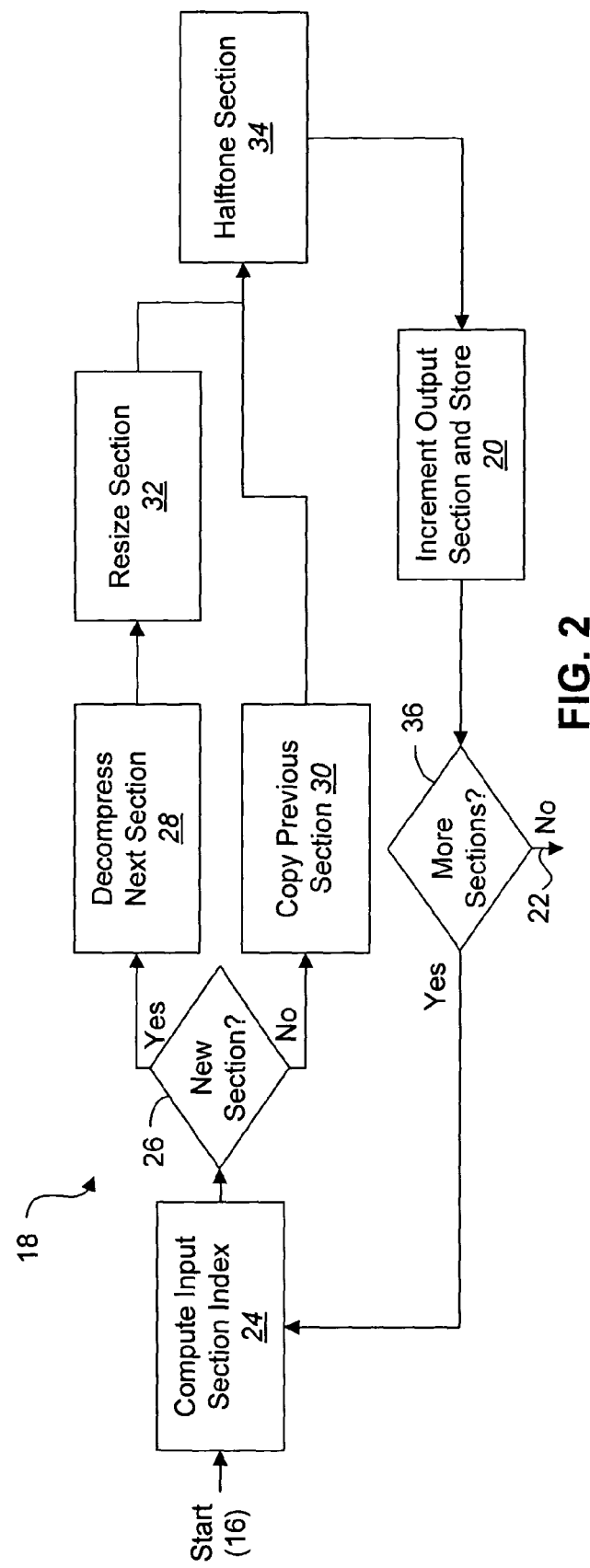
FIG. 2 is a more detailed flow diagram further illustrating the structure and methodology of what is shown in FIG. 1.

FIG. 2 in the drawings elaborates the process of the invention which has just been generally described with respect to FIG. 1. Thus, what can be seen in FIG. 2 is that included within block 18 in FIG. 1 are a "Compute Input Section Index" block 24, and a Yes/No "New Section?" inquiry block 26. Blocks 24, 26 are referred to herein collectively as selecting structure. The respective Yes and No output answers from block 26 are presented, respectively, either to a block 28 labeled "Decompress Next Section", or to a block 30 labeled "Copy Previous Section". Block 28 is also referred to herein as decompressing structure. An output from block 28 is fed to a block 32 which is labeled "Resize Section", and which is also referred to herein as resizing structure, wherein any section resizing which may be required is appropriately performed. Associated with each of blocks 28, 32 is a conventional data-section buffer (not specifically shown) wherein a section of data processed by the particular block may be temporarily stored. Output from block 32 is supplied to a block 34 which is labeled "Halftone Section". Block 34 is also referred to herein as half-toning structure. Output from block 34 is fed to previously mentioned block 20. With respect to information dealt with by block 20, there is provided another Yes/No inquiry block 36 which is labeled "More Sections ?".

In the practice of this invention, block 24 performs a computation indexing with respect to an input section, or plurality of input sections, that are to be processed. If, as determined by block 26, there is a new section (or plurality of sections) to process, decompression of that section, or plurality of sections, takes place in block 28 utilizing any appropriate decompression algorithm. The output from block 28 is then subjected to any called-for resizing, etc., in block 32, and the output from block 32 is then half-toned in block 34, with the resulting partial result then stored within the buffer mentioned earlier within block 20. If there are more sections to process, as determined by block 36, the process just described essentially repeats itself. Had the answer to the question posed by block 26 been No, then control would have been handed to block 30 whose functionality is clearly described by its labeling in FIG. 2. More specifically, block 30 looks to the data section which is then temporarily stored in the data-section buffer associated with block 32, and sends this section to block 34 for half-toning.

The architecture of an algorithm which may successfully be employed in this just-described process is as follows:

```
while (Number of Scan lines >= 0)
    if (Source Line == Previous Source Line )
        Re-halftone previous line;
    else
        read jpeg scan lines;
        Resize Line;
        Convert to Printer K;
        Halftone Line;
            Previous Source Line = Source Line;
    end if
```

```
        Target Index += Target Stride;
            Source Line += Source Height / Target Height
                E += modulo[Source Height, Target Height];
            if (E >= Target Height)
                E -= Target Height;
                Source Line += Source Stride;
            end if
        end while
```

In this manner, an entire image, such as image 14, is processed on the basis of less than whole-file units selected from the related compressed image file. Processing takes place in stages, with such selected data units being first decompressed, resized if necessary, and then half-toned and stored in a buffer, until the entire image has been dealt with. The process thus followed by practice of the invention is both speedy and efficient.

Figure 3:
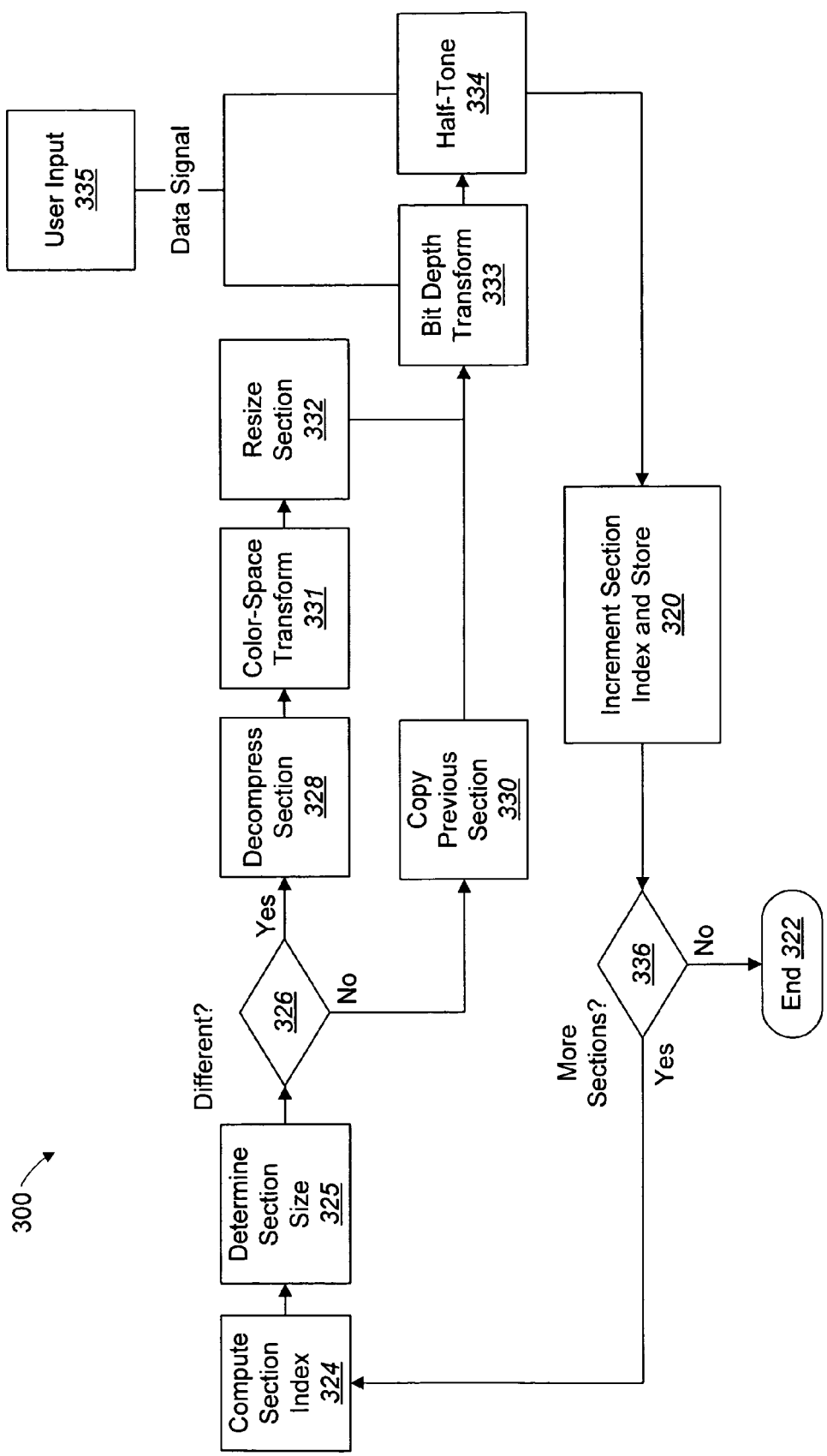
FIG. 3 is a flow diagram illustrating an alternative embodiment of a method for processing an image data file on a section-by-section basis.

FIG. 3 is a flow diagram of an alternative embodiment of the process 300 shown in FIG. 2. In particular, FIG. 3 provides a more-detailed explanation of the steps described in blocks 18 ("Decompress and Half Tone") and 20 ("Increment Output Section and Store") of FIG. 1, with additional, optional procedures and steps described below. In the illustrated embodiment, the image data may be transformed on a section-by-section basis. In one embodiment, the sections are vertical, horizontal, or diagonal rows or groups of rows (e.g., a row region) within the image data.

Following receipt of a compressed image file 16 (shown in FIG. 1), the section index is computed 324. It is then determined 325 what the size of the next section should be. The size of the section indicates the number of scan lines or regions to be processed in a single pass by the disclosed method 300. The size of the section may be determined by reference to the image format of the input file 14.

It is then determined 326 whether the new section is different from the previous section. If the new section is different, the new section is then decompressed 328, if the data is in a compressed format.

Thereafter, a color-space transformation 331 may be performed on the decompressed section. The color-space transform 331 may, in one embodiment, be based on the parameters of the input image of one color-space (e.g., RGB color, gray scale of a specific number of bits per pixel, or black and white) and a specified output device (e.g., a printer) of another color-space (e.g., CMYK color, gray scale of a specific number of bits per pixel, or black and white). For example, if the output device is a printer that is only capable of printing in black-and-white, the color-space transform 331 process may convert a section, and ultimately all, of an input color or image into a black-and-white format. The transformation 331 may also involve converting a gray-scale image to a black-and-white image or a gray-scale image having a fewer number of bits per pixel. The transformation 331 may, in one embodiment, change the image data from an RGB (read green blue) format to a CMYK (cyan magnetic yellow black) format, which is commonly used by color printers. This transformation 331 could also involve bit depth transformation or other parameters that control how an image appears when printed or viewed following processing.

Thereafter, the section is resized 332, if appropriate or requested by a user. As indicated above, resizing of the image data may be appropriate when, for example, if a user requests that multiple images be printed on a single page.

If the new section is not different from the previous section, the previous section is copied 330 from a temporary storage location (e.g., volatile or non-volatile memory). In one embodiment, the stored version of the previous section has already been decompressed 328, color-space transformed 331, and/or resized 332. Accordingly, either one or all of these steps 328, 331, 332 may be skipped with respect to processing the previously stored section.

Thereafter, the section may optionally be transformed relative to bit depth 333 and half-toning method 334. In one embodiment, the bit depth 333 and half-toning method 334 are specified by a data signal generated in response to user input 335 (via, for example, a touchpad, or button). Alternatively, the bit depth 333 and half-toning method 334 may be specified using other techniques, such as by reference to an identified or default output device.

Following these processes, the section index is incremented and the processed section is stored 320. It is then determined 336 whether the digital image contains additional sections to be processed. If there are no additional sections to be processed, the procedure is terminated 322. If there are additional sections, the process is repeated for each subsequently identified section of the specified digital image. When all sections have been processed, the processed sections are then combined (or have been combined through saving the stored images in consecutive or specific memory locations) to produce an entire digital image in an image-ready format. Within the scope of the disclosed systems and methods, various steps of transforming the image data may be omitted or performed in a different order. For example, the decompressing or resizing procedures 328, 332 may be omitted if image data is not compressed or does not need to be resized. In one embodiment, the image data is of a proper color-space and thus the color-space transform 331 is a "null" transform.

In this manner, an entire image, such as the image 14 shown in FIG. 1, is processed on the basis of less than whole-file units selected from the related compressed image file. Processing takes place in stages, with such selected data units being first decompressed and resized if necessary, and then optionally color-space transformed, bit depth transformed, half-toned, and stored in a buffer, until the entire image has been dealt with. The process thus followed by practice of the invention is both speedy and efficient.

In one embodiment, the foregoing processes may be performed using a computer system having structures (e.g., programming code) for performing the above specified procedures in connection with, for example, a desktop computer system, server, personal data assistance (PDA) embedded device, or other computing device. The structures may be embodied as hardware, software, firmware, etc., or a combination of the foregoing. With respect to procedures disclosed in FIG. 3, these structures may be referenced as follows:

a structure for performing the procedures of block 320 may be referred to herein as a "storing structure";
  a structure for performing the procedures of blocks 324, 325, and 326 may be referred to collectively as a "selecting structure;"
  a structure for performing the procedures of block 325 may be referred to as a "section size structure";
  a structure for performing the procedures of block 328 may be referred to herein as a "decompressing structure";
  a structure for performing the procedures of block 330 may be referred to as a "copy structure";
  a structure for performing the procedures of block 331 may be referred to as a "color-space transforming structure";
  a structure for performing the procedures of block 332 may be referred to as a "resizing structure";

a structure for performing the procedures of block 333 may be referred to as a "bit depth structure";

a structure for performing the procedures of block 334 may be referred to as a "half-toning structure";

a structure for performing the procedures of block 335 may be referred to as a "user input structure"; and a structure for performing the procedures of block 336 may be referred to as a "repeat structure."

These structures may be "operably connected" to exchange data and information. The term "operably connected," however, does not mean that two structures operably connected are directly connected one to another. Instead, there may be an indirect connection such that other structures, hardware, or software are interposed between the two identified structures.

In one embodiment, aspects of the disclosed systems and methods may be performed in accordance with the following excerpts of pseudo code. For example, in one configuration, the following excerpt of pseudo code may be used for the initial set up of the section-by-section image processing. More specifically, the following pseudo code calls a function referred to as "Process Image Strip" to process a specified section, or row region, of a digital image file:

```
Transform Function
    Initialize Image Header;         // Initialize IMAGEINFO header
    Image Info Setup;                // Set up image output sizes
    Page Setup;                      // Set offsets for the n-up
    // processing
    Set Color-Space transform;       // Set the color-space transform function
    Select Put Function;             // Select the put function
Start Decompress;                    // Start the decompression process
    Begin Resize;                    // Initialize and allocate the section buffer
    // Read and proces strips
    while (output scansection < output height)
        Read Image Strip;            // Read a strip of image data. This actual
    //function is determined by the image format
        Crop Image Strip;            // Crop the strip if necessary
        Process Image Strip;         // Process the strip and put it into the output
    //raster
        Output scansection = Output scansection + Strip Height;
    end while // Done with strip processing
    // Post Processing
    End Resize                       // Free scanesection buffer
    Finish Process                   // Complete the processing
    Destroy Decompress               // Destroy the decompress structure
End Transform
```

In one embodiment, the following excerpt of pseudo code may be used to process a strip, or section or row region.

```
Process Image Strip
    while (Number of Scan sections >= 0)
        if (Source Section == Previous Section)
            Re-Halftone Previous Source Section
        else
            Color-Space Transform Source Section   // Apply the color-
                                                   //space transform
            Resize Section
            Halftone Section                       // Apply the halftone function
            Previous Section = Source Section
        end if
        Target Index++;
        Source Section += ⌊Source Height/Target Height⌋
        E += modulo[Source Height/Target Height
        if (E >= TargetHeight)
            E -= Target Height
            Source Index++;
        end if
    end while
End Process Image Strip
```

In one embodiment, the following excerpt of pseudo code may be used to extend a specified section or row region to a specific length:

```
Resize Section
    while (Number of Pixels > 0)
        Target Pixel = Source Pixel
        Target Index = Target Index + 1;
        Source Index += += ⌊Source Height/Target Height⌋
        E += modulo[Source Height/Target Height]
        if (E >= TgtWidth)
            E -= Target Width;
            Source Index = Source Index + 1;
        end if
    end while
End Resize Section
```

Figure 4:
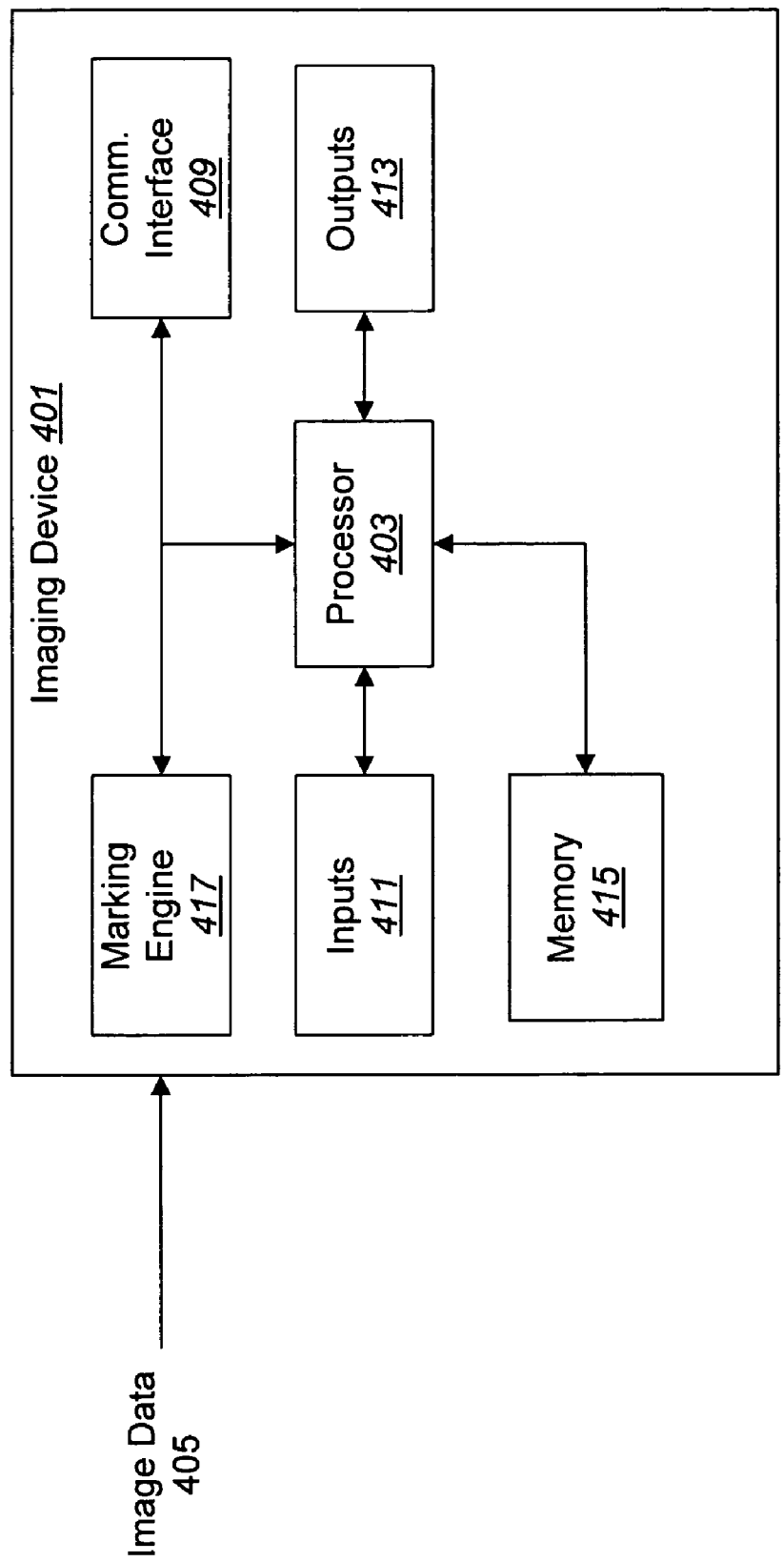
FIG. 4 is a block diagram illustrating the major hardware components typically utilized with embodiments of an imaging device.

FIG. 4 is a block diagram illustrating the major hardware components typically utilized with embodiments of an imaging device 401, which may be used perform the method described above prior to imaging (e.g., printing) received image data 405. An imaging device 401 receives image data 405. An imaging device 401 includes, but is not limited to, a multi-function peripheral ("MFP") (e.g., a printer/copier/scanner or printer/copier/fax machine), a printer, a copier, a fax machine, a plotter, a computer monitor, an electronic whiteboard, etc. The imaging device 401 may be a single or a plural grouping (e.g., pool or cluster) of two or more devices.

An imaging device 401 typically includes a processor 403 in electronic communication with various components of the imaging device 401. The processor 403 controls the operation of the imaging device 401 and may be embodied as a microprocessor, a microcontroller, a digital signal processor (DSP) or other device known in the art. The processor 403 typically performs logical and arithmetic operations based on program instructions stored within the memory 415.

The imaging device 401 may also include a marking engine 417 in communication with the processor 403. The marking engine 417 comprises the systems and components for creating an image based on received or processed image data. For example, if the imaging device is a printer (e.g., an inkjet, thermal dye sublimation, or laser printer) or a fax machine, the marking engine 417 comprises those components used to mark paper with the image specified by the image data. If the imaging device 401 is a display device, the marking engine 417 comprises those components used to display the image on the screen, in contrast to those components used to process the data received by the display device.

The processor 403 may also be in electronic communication with a communication interface 409. The communication interface 409 may be used for communications with computing devices, servers, other imaging devices, storage devices, etc. Thus, the communication interface 409 of the device 401 may be designed to send or receive signals from other devices. The communication interface 409 may be based on wired communication technology, wireless communication technology, or both. Examples of different types of communication interfaces 409 include a serial port, a parallel port, USB, an Ethernet adapter, an IEEE 1394 bus interface, a small computer system (SCSI) bus interface, an infrared (IrDA) communication port, a Bluetooth wireless communication adapter, and so forth.

The processor 403 may operably be connected to various input 411 and/or output 413 devices capable of electronic communication with the processor 403, or, in other words, with devices capable of input and/or output in the form of an electrical signal. Embodiments of imaging devices 401 may include the inputs 411, outputs 413, and processor 403 within the same physical structure or in separate housings or structures. Examples of different kinds of input devices 411 include a keypad, keyboard, mouse, microphone, remote control device, button, joystick, trackball, touchpad, touch screen, lightpen, etc. Examples of different kinds of output devices 413 include an LCD screen (for displaying the status or selected features of the imaging device 401) and a speaker.

In one embodiment, the input device 411 (such as a touch screen or button) may be used to alter settings for the imaging device 401. An output device 413 (such as an LCD screen) could be used to indicate current settings or the procedures for altering those settings.

The imaging device 401 may also include memory 415. The memory 415 may be a separate component from the processor 403, or it may be on-board memory 415 integrated with the processor 403. For example, microcontrollers often include a certain amount of on-board memory. As used herein, the term "memory" 415 is broadly defined as any electronic storage medium, such as read-only memory (ROM), random access memory (RAM), magnetic disk storage media, optical storage media, flash memory devices, on-board memory included with the processor 403, EPROM memory, EEPROM memory, registers, etc. The memory 415 typically stores program instructions and other types of data. The program instructions may be executed by the processor 403 to implement some or all of the methods disclosed herein.

In one embodiment, the imaging device 401 is an embedded device. An embedded device stores much, if not all, of its programming code in read-only memory. An embedded device is not a general purpose computer, but generally performs a specific purpose, such as imaging.

In addition, in one embodiment, the disclosed imaging device 401 is a driverless imaging device 401. In other words, image data 405 does not need to be processed by a driver before processing by the imaging device 401 to create an image.

Of course, the systems and methods disclosed herein for section-by-section processing of the digital image file may be performed by many different types computing devices, such as a desktop computer, a server, a personal data system (PDA), or a notebook computer.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for section-by-section processing of a digital image file in an imaging device, comprising:
    selecting from an image data file a yet un-decompressed section which makes up less than the whole image file;
    decompressing the selected section;
    color-space transforming the decompressed section in accordance with parameters of the image data file and an output device;
    resizing the color-space transformed section;
    half-toning the resized section;
    storing the half-toned section; and
    repeating, seriatim, the selecting, decompressing, color-space transforming, half-toning and storing steps until the whole image file has been so processed, wherein the imaging device processes the digital image file section-by-section; and
    when a selected section is the same as the last previously processed section, skipping the decompressing, color-space transforming, and resizing steps, and performing the half-toning and storing steps on a decompressed, color-space transformed, and resized version of the last-processed section to produce a processed section for the selected section.

2. The method of claim 1, further comprising receiving a data signal indicating user input specifying a desired half-toning technique, and wherein half-toning the decompressed section comprises half-toning in accordance with the specified half-toning technique.

3. The method of claim 1, further comprising receiving a data signal indicating user input specifying a desired output bit depth, and further comprising transforming the selected section to the specified output bit depth.

4. The method of claim 1, further comprising determining a format of the input image and selecting a size of the section based on a format of the image data file.

5. The method of claim 1, wherein the half-toning and color-space transforming steps operate independent of a format of the image data file.

6. A method for row-by-row processing of a digital image file in an imaging device, comprising:
    selecting from an image data file a yet un-decompressed row region which makes up less than the whole image file;
    decompressing the selected row region;
    color-space transforming the decompressed row region in accordance with parameters of the image data file and an output device;
    resizing the color-space transformed row region;
    half-toning the resized row region;
    storing the half-toned row region; and
    repeating, seriatim, the selecting, decompressing, color-space transforming, half-toning and storing steps until the whole image file has been so processed, wherein the imaging device processes the digital image file row-by-row; and
    when a selected row region is the same as the last previously processed row region, skipping the decompressing, color-space transforming, and resizing steps, and performing the half-toning and storing steps on a decompressed, color-space transformed, and resized version of the last-processed row region to produce a processed row region for the selected row region.

7. The method of claim 6, wherein the row region includes only a single data row.

8. The method of claim 6, wherein the row region includes a plurality of data rows.

9. Apparatus for performing section-by-section processing of a digital image file, the apparatus comprising a processor, memory, and a computer readable medium, the computer readable medium comprising:
    a selecting structure selecting from an image data file a yet un-decompressed section which makes up less than the whole image file;
    a decompressing structure connected to said selecting structure decompressing a selected section;
    a color-space transforming structure connected to the decompressing structure transforming the decompressed section in accordance with parameters of the image data file and an output device;
    a resizing structure which is connected to said color-space transforming and half-toning structures, wherein said resizing structure resizes color-space transformed section;
    a half-toning structure connected to said color-space transforming structure half-toning the resized section;
    a storing structure connected to said half-toning structure storing the processed section;
    a repeat structure connected to said storing structure effecting a seriatim repeat of the respective operations of current said selecting, decompressing, color-space transforming, half-toning and storing structures until the whole image file has been processed, wherein the apparatus processes the digital image file section-by-section; and
    a copy structure that when a last-processed section is the same as the selected section, skips processing by the decompressing, color-space transforming, and resizing structures, and initiates processing by the half-toning, and storing structure on a decompressed, color-space transformed, and resized version of the last-processed section to produce a processed section for the selected section.

10. The apparatus of claim 9, wherein the selected section includes only a single data section.

11. The apparatus of claim 9, wherein the selected section includes a plurality of data sections.

12. The apparatus of claim 9, further comprising a user input structure and a bit depth structure, wherein the user input structure receives user input specifying a desired bit depth, and wherein the bit depth structure receives a data signal from the user input structure specifying the desired bit depth level to which the selected section should be transformed.

13. The apparatus of claim 9, further comprising a user input structure, wherein the user input structure receives user input specifying a desired half-toning technique, and wherein the half-toning structure receives a data signal from the user input structure specifying the desired half-toning technique which should be used to transform the selected section.

14. The apparatus of claim 9, wherein a selecting structure further comprises a section size structure that determines a size of the selected section based on a format of the image data file.

15. The apparatus of claim 9, wherein the half-toning and color-space transforming structures operate independent of a format of the image data file.

* * * * *